Feb. 16, 1954   H. T. OLSON   2,669,398
FLOW FILM CAMERA

Filed Oct. 4, 1949

INVENTOR
Harold T. Olson
BY
ATTORNEY

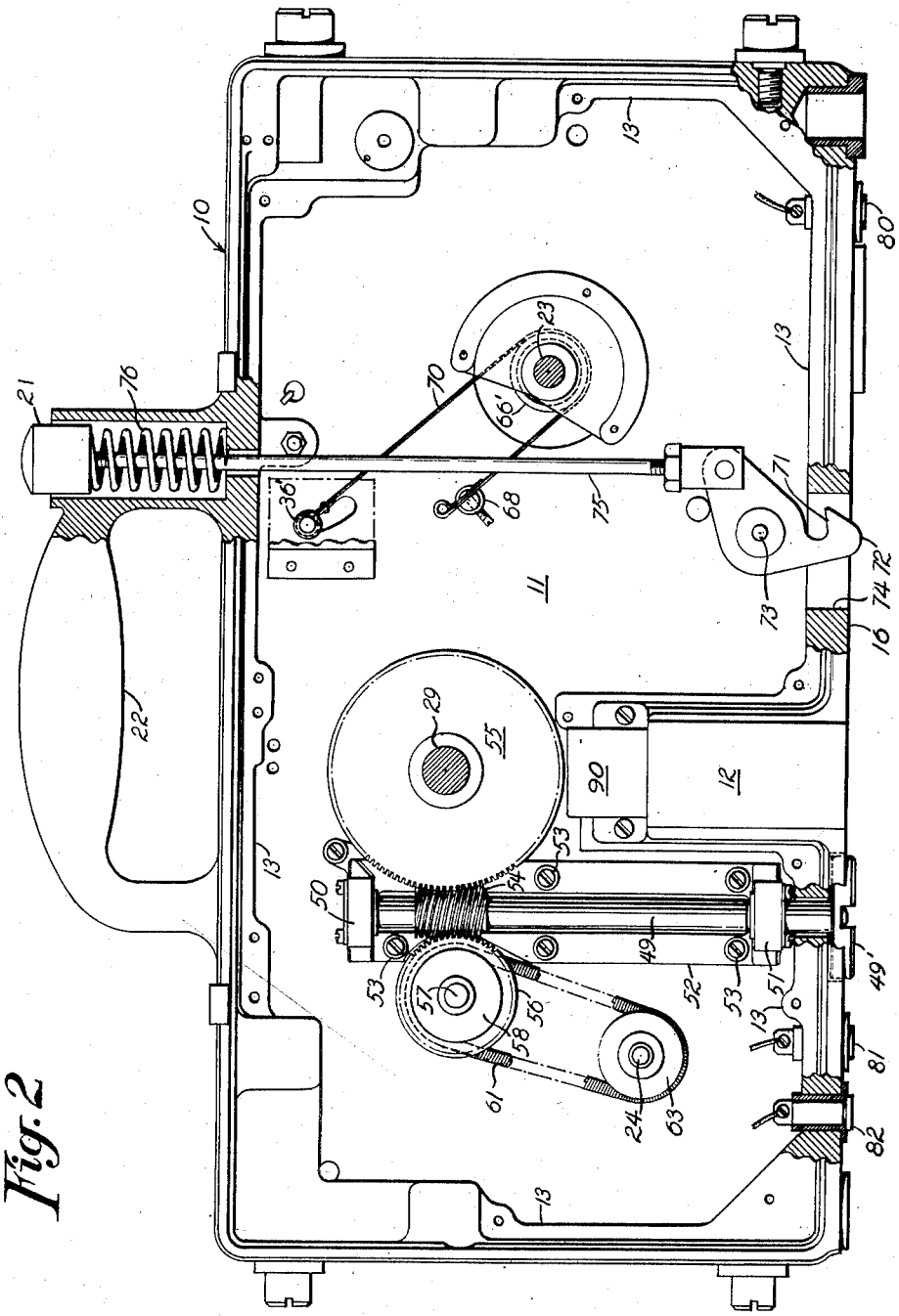

Feb. 16, 1954   H. T. OLSON   2,669,398
FLOW FILM CAMERA
Filed Oct. 4, 1949   3 Sheets-Sheet 3
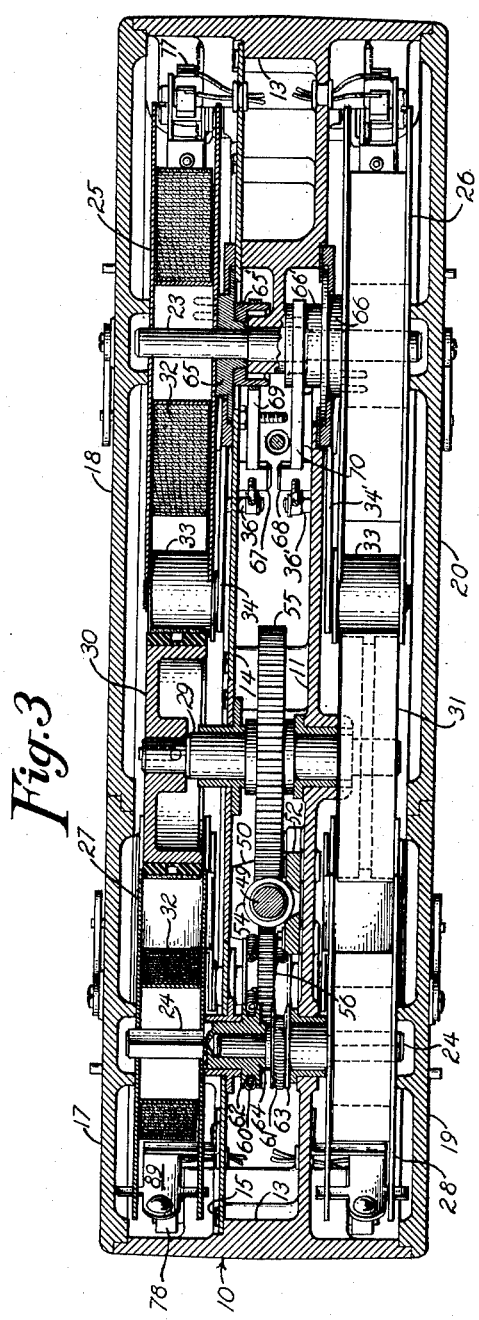
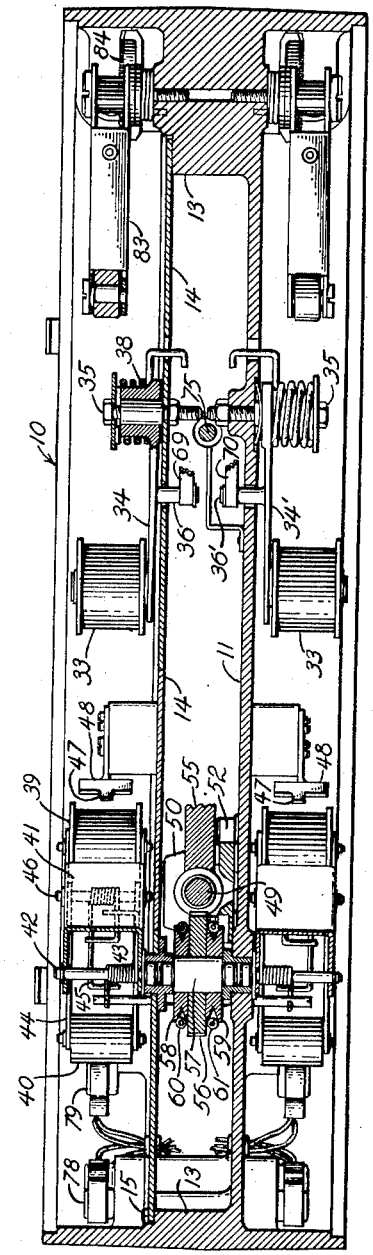
INVENTOR
Harold T. Olson
ATTORNEY Patented Feb. 16, 1954

2,669,398

UNITED STATES PATENT OFFICE 2,669,398

FLOW FILM CAMERA

Harold T. Olson, Baldwin, N. Y., assignor to Remington Rand Inc., New York, N. Y., a corporation of Delaware Application October 4, 1949, Serial No. 119,529

5 Claims. (Cl. 242—55)

1

This invention relates to flow film cameras.

The invention provides improved film feed and drive mechanism including means normally operative to maintain a predetermined degree of tension in the film and to detect and indicate defects in film feed. It is a feature of the apparatus according to the invention that the final drive to the film feed mechanism is in the form of reduction gearing so that the drive to the camera can operate at relatively high speed and thus, in the film feed, which operates through the reduction gearing at a relatively lower speed, slight irregularities in the high speed drive are smoothed out.

The invention provides for ready interchange of the reduction gearing in order to adapt the camera for different rates of film feed.

Since in many applications of flow film photography it is desirable that two separate films shall be exposed for duplication of records the preferred embodiment of the invention provides the apparatus in dual form, film feed means, with their associated controls and lenses being mounted on the outside of a hollow partition extending longitudinally of the camera casing where they are accessible through side doors of the casing. Preferably the hollow partition provides for enclosure of film feed drive means drivably connected with both of said film feed means for driving them in unison.

In the drawings, which illustrate a preferred embodiment in the form of a dual flow film camera:

Fig. 2 is a side elevation corresponding to Fig. 1 but showing one wall of the hollow partition removed to reveal the drive mechanism.

Fig. 3 is a section on the line 3—3 of Fig. 1, and

Fig. 4 is a section on the line 4—4 of Fig. 1.

Figure 1:
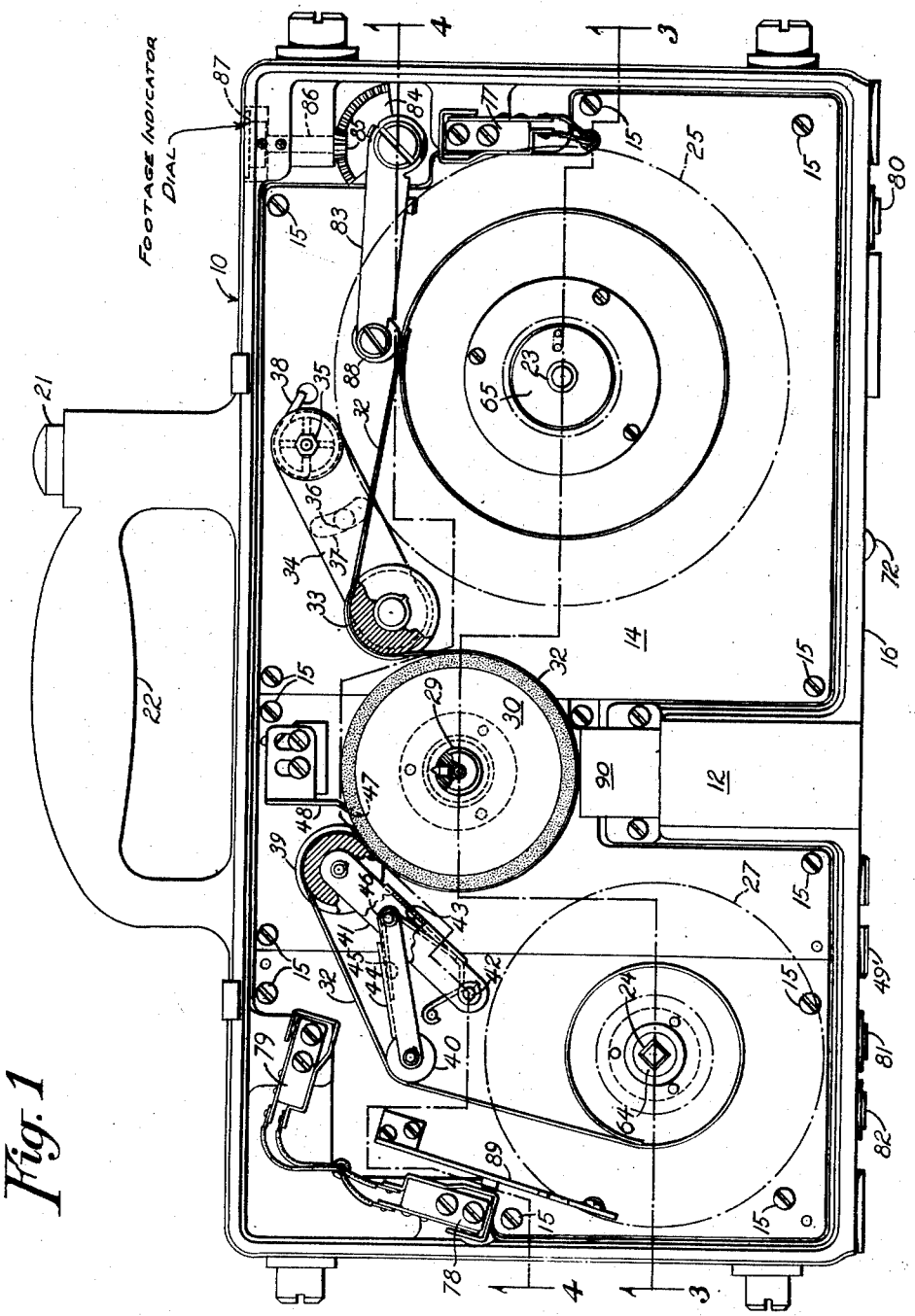
Fig. 1 is a side elevation of the camera with the side door removed to reveal the internal mechanism.

The casing of the camera is indicated by the reference numeral 10 and fundamentally is in the form of a substantial casting having an integral partition 11 extending longitudinally and also including the cast barrel 12 which receives the lens mounts. The internal rib formation 13 provides a location for the removable partition 14 which is secured in position by the screws 15. The lenses are thus provided in laterally spaced relation directed downwardly through the bottom 16 of the casing. Access doors 17, 18, 19 and 20 are provided at each side of the casing, being hinged to the bottom 16 and having fastening means operative to secure them in the closed position in which the doors are seen in Fig. 3. The camera is intended to be secured on a support base, being locked in position thereon, and a lock actuating plunger 21 is therefore incorporated with the handle 22 at the top of the casing.

It will be seen that the partition members 11 and 14 cooperate for mounting the film supply spool mounting spindle 23 which projects at each side of the hollow central partition. Film supply spools are mounted one on each projecting end of the spindle 23 for rotation with the spindle. A film take-up spool mounting spindle 24 is similarly mounted at the other end of the machine upon the projecting ends of which spindle the film take-up spools are engaged for rotation with the spindle 24 which is driven for rotation as will later be understood. The film supply and take-up spools are shown in Fig. 3 where they are indicated respectively by the reference numerals 25, 26, 27 and 28, and in Fig. 1 the position of the spools 25 and 27 is indicated in dot and dash lines. Intermediate the spindles 23 and 24 the spindle 29 has the film feed drums 30 and 31 mounted on its projecting ends. The spindle 29 is positively driven for rotation and the drums 30 and 31 are locked thereon for rotation therewith.

It will be seen from Fig. 1 that the film indicated therein by the reference numeral 32 extends from the supply spool 25 under the lower portion of the feed drum 30 to the take-up spool 27. A tensioning roller 33 mounted on the end of the lever 34 engages the underside of the film between the supply spool 25 and the feed drum 30. The lever 34 is pivotally connected to the partition 14 to move about on axis defined by the fixing bolt 35. A peg 36 projects into the arcuate slot 37 provided in the partition 14 and cooperates therewith to limit the extent of movement of the lever 34, which normally tends to rotate clockwise as viewed in Fig. 1 under the influence of the spring 38. The lever 34 controls means for braking rotation of the drum if slack develops in the film between the supply spool 25 and the feed drum 30 and it will, therefore, be appreciated that that section of the film will normally be kept taut. Between the drum 30 and the take-up spool 27, the film is similarly engaged by the rollers 39 and 40. The roller 39 is mounted on a hollow lever 41 pivoted to rotate about the pivot 42 by which it is connected to the partition 14 and a spring 43 operates to swing the lever toward the feed drum 30 so that the roller 39 presses the film against the drum. It will thus be seen from Fig. 1 that the rollers 33 and 39 operate to cause the film to embrace the drum tightly around a considerable portion of the drum circumference with a frictional grip which provides a non-slip film drive and also eliminates any possibility of the film being wrinkled in the region of the lens mount indicated in Fig. 1 by the reference numeral 90. The box structure of the lever 41 is shown partly broken away in Fig. 1 to reveal the connection thereto of the lever 44, which under the influence of the spring 45, tends to swing clockwise about the pin 46 by which it is connected to the lever 41, and the roller 40 thus operates for keeping taut that portion of the film between the drum 30 and the take-up spool 27.

The film feed drums 30 and 31 are preferably rubber covered, the covering being preferably constituted by two annular bands spaced to provide a central opening on the periphery of each drum into which the point 47 of the film stripper blade 48 can project. The stripper operates to prevent the film adhering to the drum.

In the preferred embodiment illustrated the film feed mechanism seen in Fig. 1 is completely duplicated by a similar set of mechanism at the outside of the fixed partition 11, and for access to the drive mechanism enclosed between the partition members it is necessary to disconnect the feed drum 30 from its spindle 29 and to remove the film spools, whereafter on removal of the screws 15 the partition 14 can be removed with all the parts mounted on it. The drive mechanism with the partition so removed is best seen in Fig. 2 and will now be described with reference to Fig. 2 taken in conjunction with Figs. 3 and 4.

Thus, the reference numeral 49 represents the main drive shaft which is mounted in spaced upper and lower bearings 50 and 51 respectively connected for attachment to the fixed partition 11 by the bracket 52 which is secured to the partition by the screws 53. At its lower end the shaft 49 is provided with the detachable drive coupling 49' through which drive can be transmitted from a cooperating coupling on the end of a driven shaft. The worm 54 on the main drive shaft 49 cooperates with the toothed pinion 55 on the feed drum spindle 29 for film feed drive and with the pinion 56 on the shaft 57 for driving the take-up spool spindle 24. The shaft 57 mounts pulleys 58 and 59 one on each side of the pinion 56. Those pulleys are drivingly connected by the spring belts 60 and 61, see Fig. 4, to the respective pulleys 62 and 63 on the take-up spool spindle 24.

It should be noted that the take-up spool spindle is divided within the hollow partition, the arrangement being such that the boss 64, see Fig. 3, formed integrally with one end portion of the spindle can rotate relatively to the other end portion of the spindle. Such an arrangement is desirable because the amount of film on the spool 27 will not necessarily always be the same as that on the spool 28, in which event the take-up of the respective films would be different if the spindle ends were rotated in unison. In Fig. 2, however, the belt 60 and the pulley 62 have been omitted to facilitate the showing, and it will be appreciated that the divided formation of the spindle 24, in conjunction with the two spring belt drives 60 and 61, provides the required degree of differential drive.

Fig. 2 in conjunction with Fig. 3 also shows the brake means provided in conjunction with the supply spools 25. It will be appreciated that the spindle 23 is not driven and can, in fact, be fixed, but the supply spools 25 and 26 are interlocked with the respective bosses 65 and 66 which project through the partitions 11 and 14 to mount the respective brake drums 65' and 66', see Fig. 3. From each of the respective anchorages 67 and 68, see Fig. 3, brake bands 69 and 70 extend downwardly under the respective brake drums 65' and 66' and have their respective ends connected to the pegs 36, 36' on the respective levers 34, 34', see Fig. 4. The arrangement is thus such that if excessive slack develops in the film runs between the supply spools and their respective feed drums the consequent movement of the levers 34 under their spring influence actuates the brake bands 69 and 70 to resist excessive rotation or overrunning of the supply spools.

The camera which is the subject of the present invention is primarily intended for use with the flow film photographic apparatus described in the applications, Serial Nos. 119,525; 119,526, now abandoned, and 119,527, now issued as Patent No. 2,632,360, March 24, 1953, filed concurrently herewith in which the present applicant is co-applicant with William W. Eaton. In those disclosures the camera was intended to be locked in engagement with a suspended camera support base supporting the bottom of the camera. For that purpose a bifurcated arm structure on the camera support base of the machine was mounted on a horizontal pin in spaced relationship above the camera support base. In the camera which is the subject of the present invention that pin is adapted and arranged for engagement with the slot 71 provided in the bell crank lever 72 pivoted to rock about the pivot 73 connecting the bell crank 72 to the partition 11. When the camera is fully engaged on the support base of the machine the pin is located in the slot 74 in the bottom of the camera so that as the camera is put in position on the support base the bell crank lever swings clockwise as viewed in Fig. 2 for snap engagement of the lock. The bell crank lever is connected by the rod 75 with the lock actuating plunger 21 and the compression spring 76 operative between the underside of the lock actuating plunger 21 and the base of the lock plunger compartment urges the bell crank lever 72 into the locking position for disengagement on application of pressure downwardly on the plunger 21.

The aforesaid disclosures also describe electrical controls by means of which appropriate signals are given when no film is available on the supply spool, when the take-up spool is full and also to give an indication in the event of film breakage. For such purposes the switches 77, 78 and 79 are provided which are connected with the electrical circuit of the machine described in the aforesaid applications through the respective plug contacts such as 80, 81 and 82. Thus the switch 77 is normally closed but, in the event of there being no film available on either of the supply spools, the lever 83 which is spring loaded swings anticlockwise about its pivot and engages the switch 77 to break the circuit at the switch and stop the machine. The lever 83 is also connected with the toothed quadrant 84 which drives the pinion 85 on the shaft 86 of the footage indicator having a dial portion 87 visible at the top of the camera. To prevent scratching the film the lever 83 has at its inner end the roller 88, which is mounted for free rotation. The lever thus rests on the periphery of the spooled film, the roller 88 swinging inwardly as the available supply is reduced and driving correspondingly the dial 87 which bears a scale readable against a fixed datum line on the camera casing to determine approximately the amount of film available on the supply spool for exposure. Similarly as the film builds up to fill the take-up spool the switch 78 is actuated by the lever 89 to break the circuit. Likewise, if the film breaks the arm 44 swings upwardly to break the electrical circuit at the switch 79.

The camera according to the invention as hereinbefore described can be readily adapted for different rates of film feed by interchanging the worm 54 and the pinions 55 and 56. It is also a feature of importance that, by reason of the flexibility of the take-up spool drive and its physical separation from the feed drum, vibration of the film and/or the feed drum is reduced to a minimum.

It will be appreciated that although the preferred embodiment hereinbefore described deals with a camera in dual form, all the features thereof are equally applicable to cameras in which no provision is made for duplication of the photographic record.

The invention claimed is:

1. A camera film feed comprising a casing having a longitudinally extending partition, supply and receiving spool spindles rotatably mounted in transversely extending relation in opposite end portions of said partition, a feed spindle rotatably mounted in transversely extending relation in said partition intermediate said first-mentioned spindles, said spindles all having at least one end projecting outwardly from one side of said partition, said ends at one side of said partition projecting into a film compartment in spaced substantially parallel relation, a feed drum mounted on said feed spindle in said film compartment, a primary lever pivoted on said partition, a primary roller rotatably mounted in one end of said primary lever, said primary lever being pivoted on said partition at the opposite end between said feed spindle and supply spool spindle and guiding film between a supply spool and said feed drum, means operating said primary lever to normally maintain tension on the film between the supply spool and feed drum, a second lever pivoted on said partition, a second roller rotatable in one end of said second lever, said second lever being pivoted on said partition at the opposite end between said feed spindle and receiving spool spindle, means normally operating said second lever to move said second roller toward said feed drum to retain a film strip in feeding and engaged relation between the periphery of said drum and second roller, a third lever pivoted at one end on an intermediate portion of said second lever carrying a film guide roller on the free end, means on said second and third levers normally moving said third lever relative to said second lever and cooperating therewith to normally guide and maintain tension on film during movement from said drum to a receiving spool on said receiving spool spindle, and means for normally operating selected spindles to feed film from the supply to the receiving spool about the periphery of said drum and over said rollers under tension.

2. A camera film feed comprising a casing having a longitudinally extending partition, supply and receiving spool spindles rotatably mounted in transversely extending relation in opposite end portions of said partition, a feed spindle rotatably mounted in transversely extending relation in said partition intermediate said first-mentioned spindles, said spindles all having opposite ends projecting beyond opposite sides of said partition, said ends at one side of said partition projecting into a film compartment in spaced substantially parallel relation, a feed drum mounted on said feed spindle in said film compartment, film guiding means in said compartment for guiding film between a supply spool in one end of said compartment and said feed drum, a lever pivotally mounted at one end in said compartment between the feed and receiving spool spindles carrying a film guide roller at the other end, means normally operating said lever to move the periphery of the roller on the end thereof toward the periphery of said feed drum for maintaining a strip of film engaged between the peripheries of said drum and roller in feeding relation, a lever mounted on the last-mentioned lever at one end for pivotal movement thereon having a film guide roller at the opposite end for guiding film between the roller on said first-mentioned lever and a receiving spool on said receiving spool spindle, means engaging both of said levers for normally moving the last-mentioned lever relative to the first-mentioned lever to normally maintain tension on a film strip extending between said drum and a receiving spool, and drive means on the opposite side of said partition connected with the other end of said drive spindle and said receiving spool spindle for normally feeding film from a supply spool on said supply spool spindle about said feed drum, guide means and guide rollers to a receiving spool on said receiving spool spindle.

3. A camera film feed, as claimed in claim 1, having a peg mounted on said primary lever projecting through a slot formed in said partition, a brake band having one end secured to the free end of said peg on the opposite side of said partition from said lever, a brake drum mounted on the end of said supply spool spindle at the other side of said partition, an intermediate portion of said brake band engaging about the periphery thereof, and an anchor for the opposite end of said brake band on said other side of said partition, said primary lever being operable to apply a braking tension on said supply spool spindle in outward movement on the free end of said lever away from said supply spool spindle.

4. A camera film feed, as claimed in claim 2, wherein a drive shaft is mounted on the other side of said partition in spaced parallel relation thereto between said feed spindle and said receiving spool spindle, a worm drive gear on said drive shaft opposite said feed spindle, a worm gear on the end of said feed spindle at said other side of said partition intermeshed with the worm gear on said drive shaft, a second worm gear rotatably mounted on the other side of said partition and intermeshed with the worm on said drive shaft at the opposite side of the worm gear carried by said feed spindle in substantially parallel relation therewith, said second worm gear carrying a pulley, a pulley mounted on the end of the receiving spool spindle at the other side of said partition in aligned relation to the pulley on said second worm gear, and an endless belt engaged over said pulleys for cooperation in the operation of said drive shaft to rotate the feed drum and receiving spool spindle for feeding a film strip from a supply spool on the supply spool spindle about the guide means, feed drum and guide rollers to a receiving spool on the receiving spool spindle and normally maintain tension on said strip during travel between said spools.

5. A camera film feed, as claimed in claim 2, wherein said casing is formed with spacing means on the opposite side of said partition, a removable partition mounted in said casing and held in spaced parallel relation to the first-mentioned partition by said spacing means, said removable partition having supply and receiving spool spindles mounted thereon in aligned relation to the corresponding spindles in the first-mentioned partition, said receiving spool spindles on both partitions having the inner ends on the sides of each partition opposite to the film compartment terminating in adjacent aligned relation, a shaft having opposite ends rotatably mounted in bearings carried by said partition and extending therebetween in spaced parallel relation between said feed and receiving spool spindles, a worm gear mounted in the central portion of said shaft, pulleys mounted on opposite sides of said worm gear in aligned relation to the pulleys on said receiving spool shafts, endless belts engaged over pulleys on each side of said worm gear and the aligned pulleys on said receiving spool shafts for independently driving the receiving spool shafts in the operation of said worm gear and shaft, the other end of said feed spindle having a rotatable bearing in and projecting through and beyond the outer side of said removable partition, a feed drum on the outer end of said other end, a worm gear on said feed spindle between said partitions, a drive shaft mounted on the first mentioned partition carrying a worm gear engaged between the worm gear on said shaft and said feed spindle and operable to drive said feed spindle and receiving spool spindles for winding two lengths of film from supply spools on said supply spool spindles carried by each of said partitions to receiving spools on the receiving spool spindles carried by each of said partitions.

HAROLD T. OLSON.

References Cited in the file of this patent
UNITED STATES PATENTS

| Number | Name | Date |
|---|---|---|
| 942,164 | Bolton | Dec. 7, 1909 |
| 1,090,128 | Avers | Mar. 7, 1914 |
| 1,314,055 | Francis | Aug. 26, 1919 |
| 1,642,681 | Kaplan | Sept. 20, 1927 |
| 1,843,650 | Schlicker | Feb. 2, 1932 |
| 1,957,889 | Hopkins et al. | May 8, 1934 |
| 2,097,142 | Borton | Oct. 26, 1937 |
| 2,207,075 | Sperry | July 9, 1940 |
| 2,403,587 | Doyle et al. | July 9, 1946 |